United States Patent
Jandhyala et al.

(10) Patent No.: US 12,289,559 B2
(45) Date of Patent: Apr. 29, 2025

(54) GESTURE TRACKING SYSTEM

(71) Applicant: APPLE INC., Cupertino, CA (US)

(72) Inventors: Sai Harsha Jandhyala, Santa Clara, CA (US); Raffi A. Bedikian, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 458 days.

(21) Appl. No.: 17/590,036

(22) Filed: Feb. 1, 2022

(65) Prior Publication Data

US 2022/0157083 A1 May 19, 2022

Related U.S. Application Data

(63) Continuation of application No. PCT/US2020/048863, filed on Sep. 1, 2020.
(Continued)

(51) Int. Cl.
*G06T 7/246* (2017.01)
*G06T 7/73* (2017.01)
(Continued)

(52) U.S. Cl.
CPC .............. *H04N 5/33* (2013.01); *G06T 7/246* (2017.01); *G06T 7/73* (2017.01); *G06T 7/90* (2017.01);
(Continued)

(58) Field of Classification Search
CPC .. H04N 5/33; G06T 7/246; G06T 7/73; G06T 7/90; G06T 2207/10024;
(Continued)

(56) References Cited

U.S. PATENT DOCUMENTS 8,890,803 B2   11/2014   Oks et al.
9,063,574 B1   6/2015    Ivanchenko
(Continued)

FOREIGN PATENT DOCUMENTS

WO   2012082971 A1   6/2012
WO   2018174441 A1   9/2018

OTHER PUBLICATIONS

Amir, Arnon, et al. "A low power, fully event-based gesture recognition system." Proceedings of the IEEE conference on computer vision and pattern recognition. 2017. (Year: 2017).*
(Continued)

*Primary Examiner* — Utpal D Shah
(74) *Attorney, Agent, or Firm* — Thompson Hine LLP

(57) ABSTRACT

Various implementations disclosed herein include devices, systems, and methods that identify a gesture based on event camera data and frame-based camera data (e.g., for a CGR environment). In some implementations at an electronic device having a processor, event camera data is obtained corresponding to light (e.g., IR light) reflected from a physical environment and received at an event camera. In some implementations, frame-based camera data is obtained corresponding to light (e.g., visible light) reflected from the physical environment and received at a frame-based camera. In some implementations, a subset of the event camera data is identified based on the frame-based camera data, and a gesture (e.g., of a person in the physical environment) is identified based on the subset of event camera data. In some implementations, a path (e.g., of a hand) by tracking a grouping of blocks of event camera events in the subset of event camera data.

14 Claims, 9 Drawing Sheets

Related U.S. Application Data

(60) Provisional application No. 62/898,119, filed on Sep. 10, 2019.

(51) Int. Cl.
*G06T 7/90* (2017.01)
*G06V 10/143* (2022.01)
*G06V 10/20* (2022.01)
*G06V 10/70* (2022.01)
*G06V 10/80* (2022.01)
*G06V 40/20* (2022.01)
*H04N 5/33* (2023.01)

(52) U.S. Cl.
CPC ............ *G06V 10/143* (2022.01); *G06V 10/20* (2022.01); *G06V 10/70* (2022.01); *G06V 10/803* (2022.01); *G06V 40/20* (2022.01); *G06V 40/28* (2022.01); *G06T 2207/10024* (2013.01); *G06T 2207/20081* (2013.01); *G06T 2207/30196* (2013.01)

(58) Field of Classification Search
CPC G06T 2207/20081; G06T 2207/30196; G06V 10/803; G06V 10/20; G06V 10/70; G06V 40/28; G06V 10/143; G06V 40/20
See application file for complete search history.

(56) References Cited

U.S. PATENT DOCUMENTS

| | | | |
|---|---|---|---|
| 9,465,444 B1 | 10/2016 | Ramaswamy | |
| 9,513,715 B2 | 12/2016 | Nakama | |
| 9,513,768 B2 | 12/2016 | Zhao et al. | |
| 9,868,449 B1 | 1/2018 | Holz et al. | |
| 2012/0257789 A1 | 10/2012 | Lee et al. | |
| 2014/0184498 A1* | 7/2014 | Lee | G06T 7/254 345/156 |
| 2014/0320403 A1* | 10/2014 | Lee | H04N 25/47 345/156 |
| 2015/0168553 A1 | 6/2015 | Lee et al. | |
| 2018/0173948 A1* | 6/2018 | Gousev | H04N 23/20 |
| 2019/0058859 A1 | 2/2019 | Price et al. | |
| 2022/0129066 A1* | 4/2022 | Zahnert | G06Q 30/0601 |
| 2023/0419439 A1* | 12/2023 | Eble | G06T 7/50 |

OTHER PUBLICATIONS

PCT) European Patent Office (ISA/EP), International Search Report and Written Opinion of the International Searching Authority, International Application No. PCT/US2020/048863, 15 pages, Dec. 1, 2020.

Keung, B. et al., Low-Latency Visual Odometry Using Event-Based Feature Tracks, 2016 IEEE/RSJ International Conference on Intelligent Robots and Systems (IROS), Daejeon, Korea, pp. 16-23, Oct. 2016.

Liu, H. et al., "Combined frame- and event-based detection and tracking," 2016 IEEE International Symposium on Circuits and Systems (ISCAS), IEEE, pp. 2511-2514, May 2016.

Li, Shelei and Huang, Mengxing, "Digital image dynamic recognition system based on Kinect and HMM gesture," (includes English Abstract), Modern Electronics Technique, vol. 41, No. 23, 5 pages, 2018.

* cited by examiner

GESTURE TRACKING SYSTEM

TECHNICAL FIELD

The present disclosure generally relates to systems, methods, and devices for using camera data for object tracking or gesture recognition.

BACKGROUND

Hand movements and other gestures may involve relatively quick movements. Accordingly, gesture recognition systems that use images from traditional frame-based cameras may lack accuracy and efficiency or otherwise be limited by the relatively slow frame rates that such cameras use. Event cameras capture events as they occur for each pixel and may provide the capability to capture data about user movements significantly faster than many frame-based cameras. However, gesture recognition systems that use event camera data may face challenges in attempting to identify the gestures of a user because, in a given physical environment, there may be many events that are unrelated to a gesture that is being tracked. The need to analyze and interpret potentially vast amounts of event data from a physical environment may significantly reduce the ability of such event camera-based gesture recognition systems to quickly, efficiently, and accurately identify gestures.

SUMMARY

Various implementations disclosed herein include devices, systems, and methods for event camera-based gesture recognition using a subset of event camera data. In some implementations, a gesture is identified based on a subset of event camera data. In some implementations, the subset of event camera data is identified by a frame-based camera having a field of view (FOV) that overlaps the event camera FOV. In some implementations, the event camera FOV and the frame-based camera FOV are temporally or spatially correlated. In one implementation at an electronic device having a processor, event camera data is generated by light (e.g., infrared (IR) light) reflected from a physical environment and received at an event camera. In some implementations, frame-based camera data is generated by light (e.g., visible light) reflected from the physical environment and received at a frame-based camera. In some implementations, the frame-based camera data is used to identify a region of interest (e.g., a bounding box) for the event camera to analyze. For example, the frame-based camera data may be used to remove the background from consideration in the event camera data analysis. In some implementations, identifying the subset of the event camera data includes selecting only event camera data corresponding to a portion of a user (e.g., hands) in the physical environment. In some implementations, the event camera is tuned to IR light to reduce noise.

Various implementations disclosed herein include devices, systems, and methods that identify a path (e.g., of a hand) by tracking a grouping of blocks of event camera events. Each block of event camera events may be a region having a predetermined number of events that occur at a given time. The grouping of blocks may be performed based on a grouping radius, a distance, or time, e.g., blocks within a given 3D distance of another block occurring at an instant in time are included. Tracking a grouping of blocks as the grouping of blocks recurs at different points in time may be easier and more accurate than trying to track individual events moving over time, e.g., correlating events associated with the tip of the thumb at different points in time.

Various implementations disclosed herein include devices, systems, and methods that obtain event camera data corresponding to light (e.g., IR or first wavelength range) reflected from a physical environment. In some implementations, blocks of events that are associated with multiple times are identified based on blocking criteria. For example, each block may be a region having a predetermined number of events that occur at a given time or time period of predetermined length. In some implementations, an entity (e.g., a hand) is identified at each of the multiple times. In some implementations, a path is determined by tracking a position of the entity at the multiple times. In some implementations, the entity at each of the multiple times includes a subset of the blocks of events associated with a respective time. In some implementations, the subset of blocks is identified based on grouping criteria. In some implementations, tracking a position of the entity at each of the multiple times as the entity moves over time provides a path such as the path of a hand of a person as the hand moves over time. In some implementations, frame-based camera data corresponding to light reflected from the physical environment is received and the event camera data is identified based on the frame-based camera data.

In some implementations, the electronic device is the electronic device where processing of the event camera data occurs. In some implementations, the electronic device is the same electronic device that includes the event camera (e.g., laptop). In some implementations, the electronic device is a different electronic device that receives the event data from an electronic device that has the event camera (e.g. a server receiving the event data from the laptop). In some implementations, a single electronic device including a processor has the event camera, an IR light source, and the frame-based camera (e.g., laptop). In some implementations, the event camera, the IR light source, and the frame-based camera are located on more than one electronic device.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
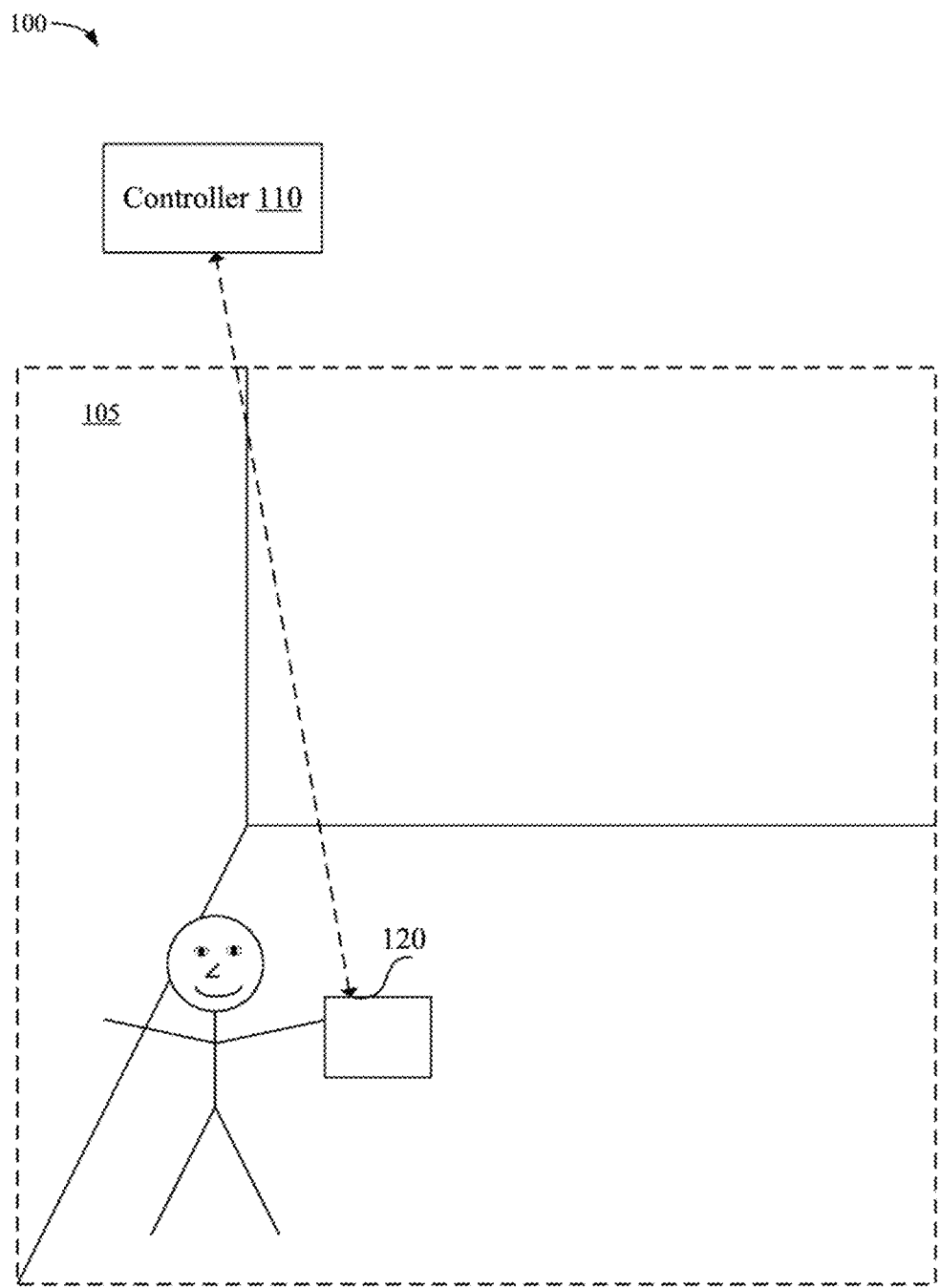
FIG. 1 is a block diagram of an example system in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Figure 2:
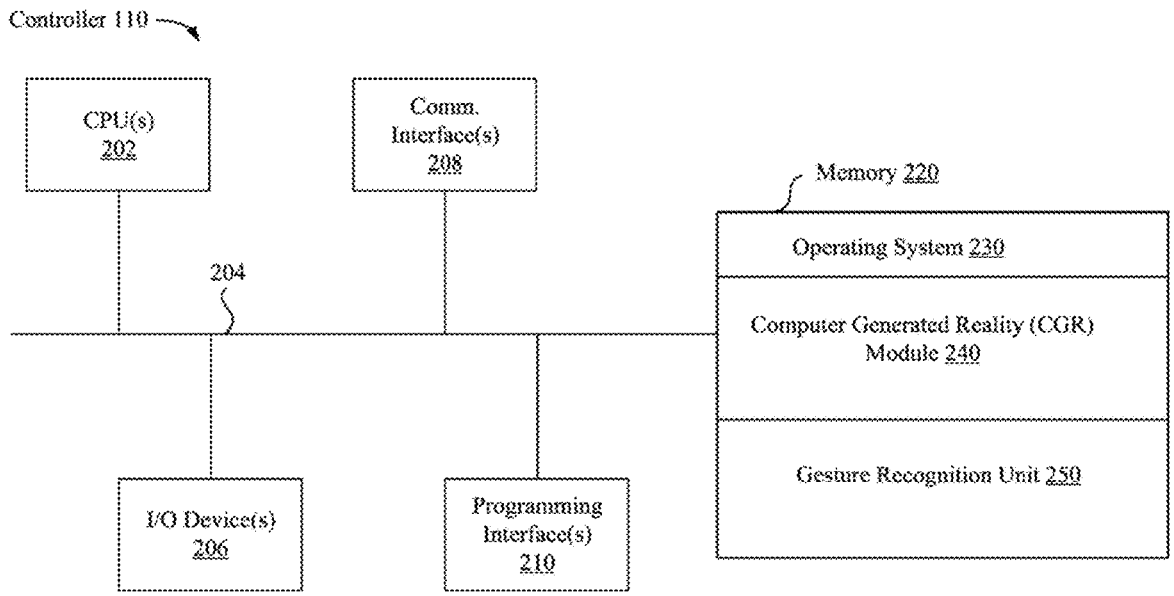
FIG. 2 is a block diagram of an example controller, in accordance with some implementations.
Figure 3:
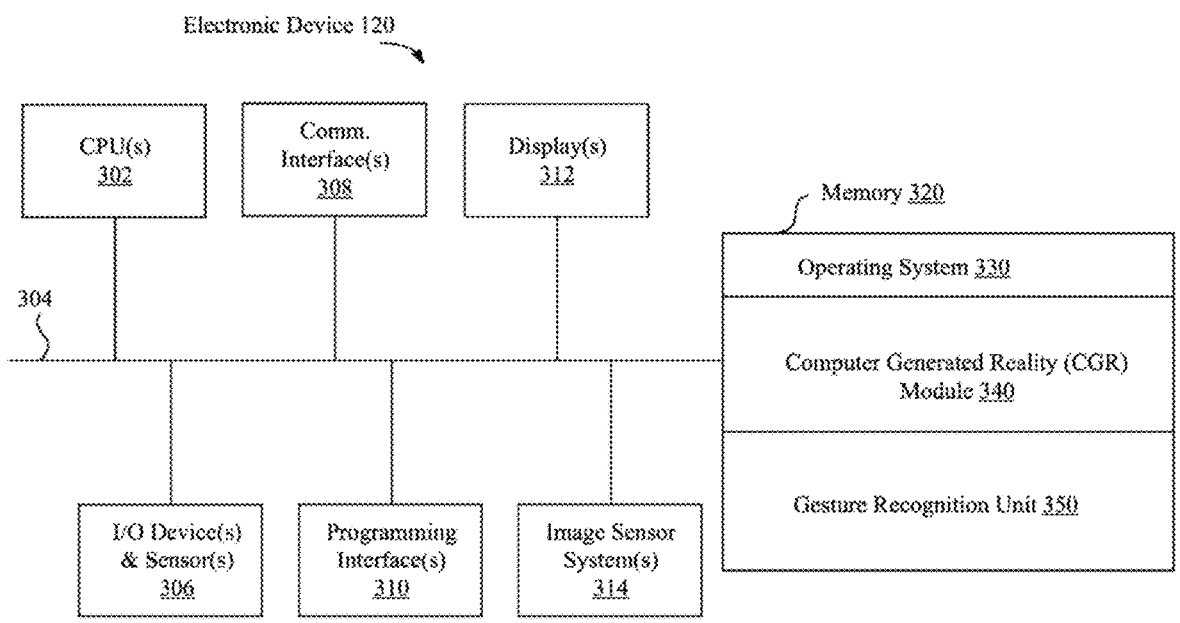
FIG. 3 is a block diagram of an example electronic device, in accordance with some implementations.

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects or variants do not include all of the specific details described herein. Moreover, well-known systems, methods, components, devices and circuits have not been described in exhaustive detail so as not to obscure more pertinent aspects of the example implementations described herein. While FIGS. 1-3 depict exemplary implementations involving electronic devices including, but not limited to, watches and other wearable electronic devices, mobile devices, laptops, desktops, HMDs, gaming devices, home automation devices, accessory devices, and other devices that include or use image capture devices.

FIG. 1 is a block diagram of an example operating environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes a controller 110 and an electronic device (e.g., laptop) 120, one or all of which may be in a physical environment 105. A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In some implementations, the controller 110 is configured to manage and coordinate a computer-generated reality (CGR) environment for the user. In some implementations, the controller 110 includes a suitable combination of software, firmware, or hardware. The controller 110 is described in greater detail below with respect to FIG. 2. In some implementations, the controller 110 is a computing device that is local or remote relative to the physical environment 105.

In one example, the controller 110 is a local server located within the physical environment 105. In another example, the controller 110 is a remote server located outside of the physical environment 105 (e.g., a cloud server, central server, etc.). In some implementations, the controller 110 is communicatively coupled with a corresponding electronic device 120 via one or more wired or wireless communication channels 144 (e.g., BLUETOOTH, IEEE 802.11x, IEEE 802.16x, IEEE 802.3x, etc.).

In some implementations, the controller 110 and a corresponding electronic device (e.g., 120) are configured to present the CGR environment to the user together.

In some implementations, the electronic device 120 is configured to present the CGR environment to the user. In some implementations, the electronic device 120 includes a suitable combination of software, firmware, or hardware. The electronic device 120 is described in greater detail below with respect to FIG. 3. In some implementations, the functionalities of the corresponding controller 110 is provided by or combined with the electronic device 120, for example, in the case of an electronic device that functions as a stand-alone unit.

According to some implementations, the electronic device 120 presents a CGR environment to the user while the user is present within the physical environment 105. A CGR environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality. A virtual reality (VR) environment refers to a simulated environment that is designed to be based entirely on computer-generated sensory inputs for one or more senses. A VR environment comprises virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality. An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

FIG. 2 is a block diagram of an example of a controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the controller 110 includes one or more processing units 202 (e.g., microprocessors, application-specific integrated-circuits (ASICs), field-programmable gate arrays (FPGAs), graphics processing units (GPUs), central processing units (CPUs), processing cores, or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a joystick, one or more microphones, one or more speakers, one or more image capture devices or other sensors, one or more displays, or the like.

The memory 220 includes high-speed random-access memory, such as dynamic random-access memory (DRAM), static random-access memory (CGRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof including an optional operating system 230, computer-generated reality (CGR) module 240, and gesture recognition unit 250.

The operating system 230 includes procedures for handling various basic system services and for performing hardware dependent tasks.

In some implementations, the CGR module 240 is configured to create, edit, present, or experience CGR environments. The CGR module 240 is configured to present virtual content that will be used as part of CGR environments for one or more users. For example, the user may view and otherwise experience a CGR-based user interface that allows the user to select, place, move, and otherwise present a CGR environment, for example, based on the virtual content location via hand gestures, voice commands, input device inputs, etc.

In some implementations, the gesture recognition unit 250 is configured to use event camera data to determine a path of an entity or for gesture recognition. In some implementations, the gesture recognition unit 250 uses frame-based camera data. In some implementations, the gesture recognition unit 250 is used as a functional I/O device or as part of a CGR environment for one or more users. Although these modules and units are shown as residing on a single device (e.g., the controller 110), it should be understood that in other implementations, any combination of these modules and units may be located in separate computing devices.

Moreover, FIG. 2 is intended more as functional description of the various features which are present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, or firmware chosen for a particular implementation.

FIG. 3 is a block diagram of an example of an electronic device 120 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the electronic device 120 includes one or more processing units 302 (e.g., microprocessors, ASICs, FPGAs, GPUs, CPUs, processing cores, or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, or the like type interface), one or more programming (e.g., I/O) interfaces 310, one or more displays 312, one or more interior or exterior facing image sensor systems 314, a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), or the like.

In some implementations, the one or more displays 312 are configured to present a CGR environment to the user. In some implementations, the one or more displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), or the like display types. In some implementations, the one or more displays 312 correspond to diffractive, reflective, polarized, holographic, etc. waveguide displays. For example, the electronic device may include a single display. In another example, the electronic device may include a display for each eye of the user.

The memory 320 includes high-speed random-access memory, such as DRAM, CGRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330, computer-generated reality (CGR) module 340, and gesture recognition unit 350.

The operating system 330 includes procedures for handling various basic system services and for performing hardware dependent tasks.

In some implementations, the CGR module 340 is configured to create, edit, present, or experience CGR environments. The CGR module 340 is configured to present virtual content that will be used as part of CGR environments for one or more users. For example, the user may view and otherwise experience a CGR-based user interface that allows the user to select, place, move, and otherwise present a CGR environment, for example, based on the virtual content location via hand gestures, voice commands, input device inputs, etc.

In some implementations, the gesture recognition unit 350 is configured to use event camera data to determine a path of an entity or for gesture recognition. In some implementations, the gesture recognition unit 350 uses frame-based camera data. In some implementations, the gesture recognition unit 350 is used as a functional I/O device or as part of a CGR environment for one or more users. Although these modules and units are shown as residing on a single device (e.g., the electronic device 120), it should be understood that in other implementations, any combination of these modules and units may be located in separate computing devices.

Moreover, FIG. 3 is intended more as a functional description of the various features which are present in a particular implementation as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, or firmware chosen for a particular implementation.

Figure 4:
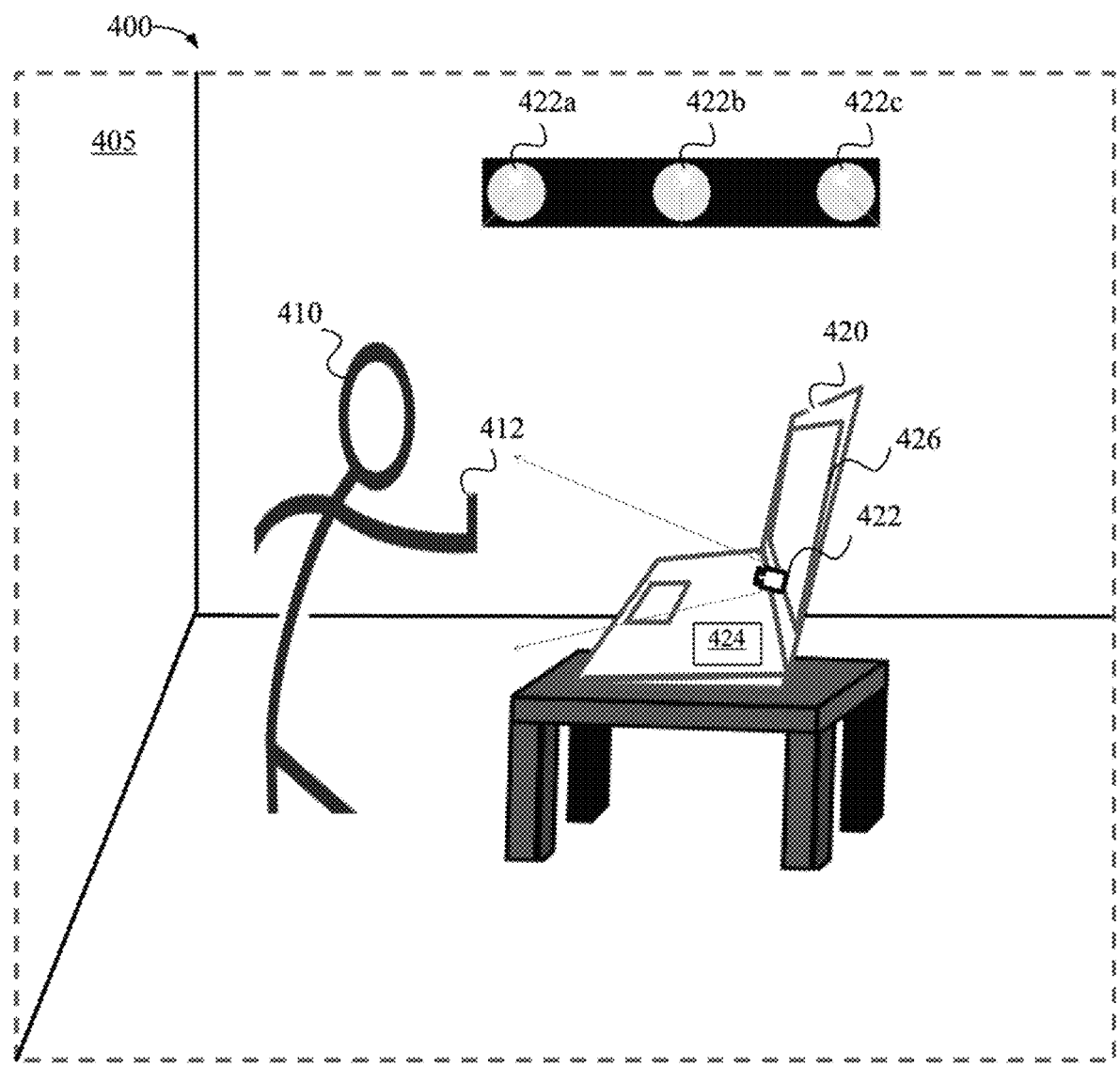
FIGS. 4-6 are block diagrams of an example configuration of an electronic device including an event camera to track a path of an entity (e.g., a hand) in accordance with some implementations.
Figure 5:
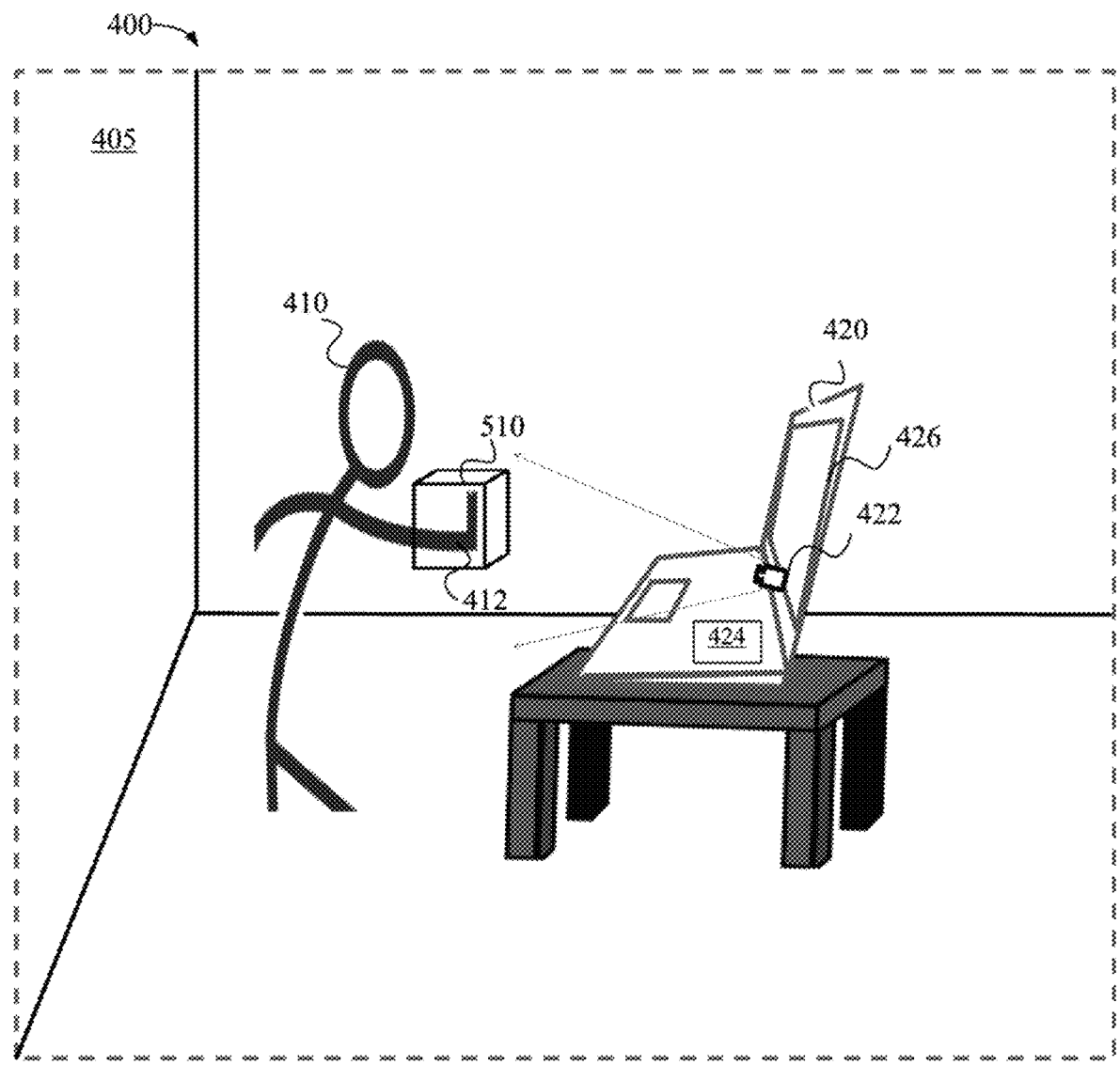
Figure 6:
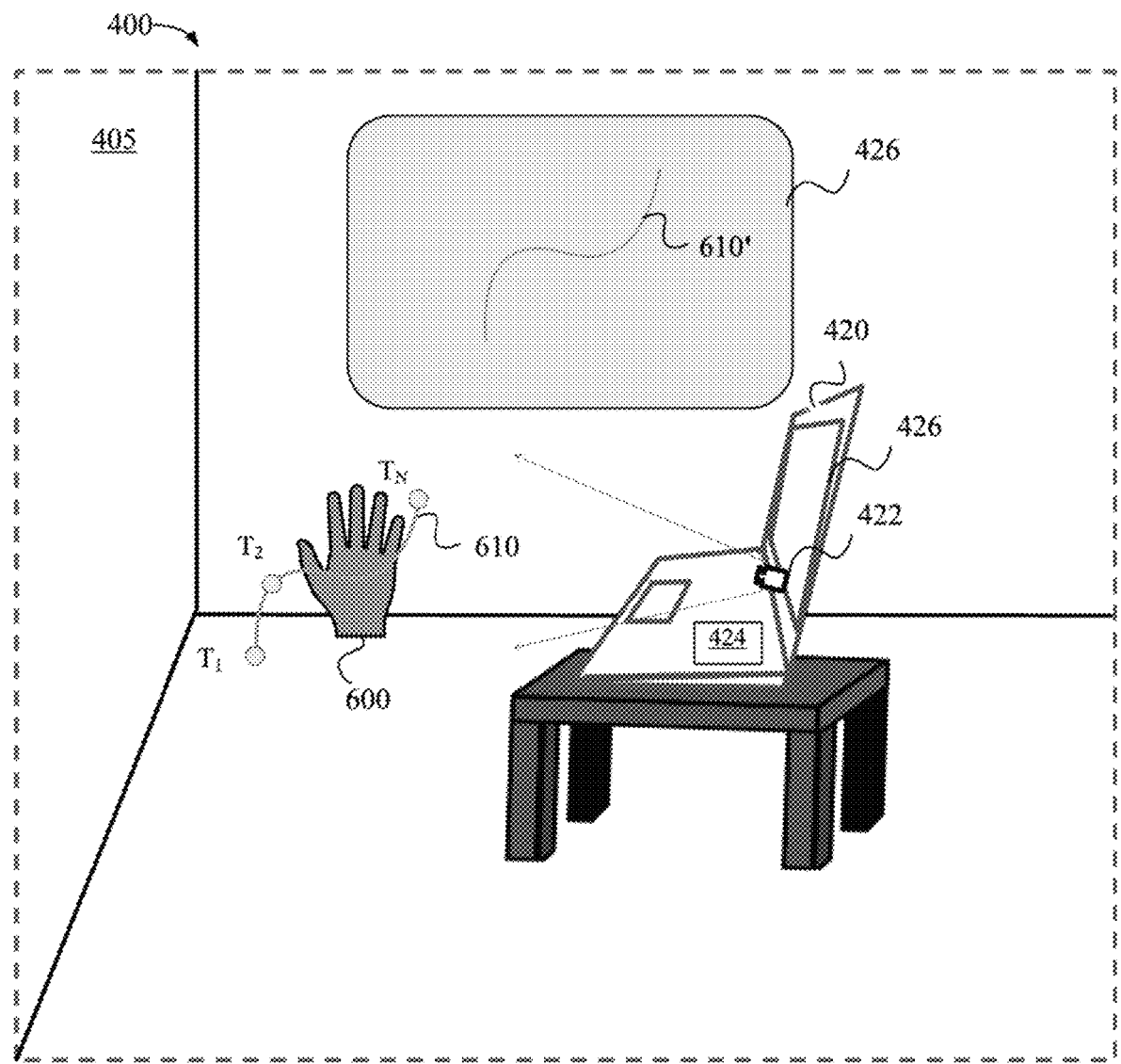

FIGS. 4-6 are block diagrams of an example configuration of an electronic device including an event camera to track a path of an entity (e.g., a hand) in accordance with some implementations. In some implementations, the path of the entity is used for gesture recognition.

As shown in FIG. 4, an electronic device 420 in a physical environment 405 includes a processor 424 and a tracking array 422. In some implementations, the tracking array 422 includes an event camera 422b and a frame-based camera 422c. As shown in FIG. 4, the tracking array 422 includes an optical source (e.g., IR LED), the event camera 422b, and the frame-based camera 422c (e.g., RGB-D). In some implementations, the tracking array 422 is operatively mounted on the electronic device 420. In some implementations, the tracking array 422 is mounted on the electronic device 420 below, to the side, or above a display 426.

In some implementations, the event camera 422b is always on because of its low power consumption. In some implementations, the event camera 422b operates at very high frame rates when monitoring the physical environment 405. In some implementations, the event camera 422b detects events faster than 1000 htz. Thus, the electronic device 420 can smoothly track a person 410 or a hand 412 of the person 410 using the event camera 422b in the physical environment 405.

As shown in FIG. 4, event camera data corresponds to light reflected from the physical environment 405 and received at the event camera 422b. In some implementations, the event camera data corresponds to the light reflected and received at the event camera 422b in a first wavelength band. In some implementations, the event camera 422b is tuned (e.g., using a filtered light source or filters at the light source or the event camera) to the first wavelength band. In some implementations, the event camera 422b uses IR light. In some implementations, the event camera 422b uses IR light to reduce noise (e.g., interference with visible light) in the event camera data. In some implementations, the IR light can be focused over a preset operational range (e.g., distance, height, or width). In some implementations, the IR light is provided by optical source 422a. In some implementations, the optical source 422a can be an infrared (IR) light source. In some implementations, the optical source 422a can be an near-infrared (NIR) light source. In some implementations, the optical source 422a is an IR light source including an IR LED, diffuser optics, or focusing optics.

In some implementations, the FOV of the event camera 422b and an emission cone of the optical source 422a are spatially correlated or overlap. In some implementations, the optical source 422a is configured as an IR light source that is variable in size, intensity, or steerable. For example, because the intensity of the reflected IR light is reduced based on distance (e.g., distance$^2$), in some implementations, the IR source 422a is adjusted in intensity to control or optimize the number of events or reduce noise.

As shown in FIG. 4, frame-based camera data corresponds to light (e.g., visible light) reflected from the physical environment 405 and received at the frame-based camera 422c. In some implementations, the frame-based camera data corresponds to the light reflected and received at the frame-based camera 422c in a second wavelength band (e.g., visible light). In some implementations, the second wavelength band used by the frame-based camera 422c is different from the first wavelength band used by the event camera 422b. In some implementations, a FOV of the physical environment 405 of the event camera 422b and a FOV of the physical environment 405 of the frame-based camera 422c are spatially correlated. In various implementations, the FOV of the event camera 422b and the FOV of the frame-based camera 422c overlap. In some implementations, the frame-based camera data and the event camera data are temporally and spatially correlated.

As shown in FIG. 5, a subset of the event camera data from the event camera 422b in the physical environment 405 can be determined. In some implementations, the subset of event camera data is based on the frame-based camera data. In some implementations, the frame-based camera 422c identifies a bounding box 510 in the physical environment 405 within which the event camera 422b analyzes event camera data. For example, the frame-based camera 422c identifies and then reduces or removes the background in the physical environment 405 from consideration in the event camera 422b analysis. In some implementations, the frame-based camera 422c selects a foreground portion of the physical environment 405 for consideration in the event camera analysis. For example, the frame-based camera 422c identifies the person 410 as the foreground of the physical environment 405. Alternatively for example, the frame-based camera 422c identifies hand(s) 412 as the foreground and the person 410 as the background of the physical environment 405. In some implementations, the frame-based camera 422c identifies the subset of the event camera data using color analysis of the frame-based camera data. for example, a color of the hands can be identified and in the physical environment to determine a region of interest for the event camera 422b. In some implementations, the frame-based camera 422c uses a low frame rate. In some implementations, the frame-based camera 422c uses a frame rate of 2-10 frames per second.

As shown in FIG. 6, in some implementations, blocks of events within the subset of event data (e.g., bounding box 510) associated with multiple times are identified based on blocking criteria. In some implementations, each block of the blocks of events is a region in the physical environment 405 that includes a predetermined number of events that occur at a given time (e.g., small time interval) for each of a plurality of times $T_1, T_2, \ldots, T_N$. In some implementations, the number of events determines a size or resolution of the blocks of events. In some implementations, a larger number of events in each block decreases a resolution of the event camera 422b analysis. In some implementations, the number of blocks of events at each of the plurality of times is the same. In some implementations, the number of blocks of events at each of the plurality of times is different. For example, there may be 1000 blocks of events associated with a time $T_1$, and 1400 blocks of events associated with a second time $T_2$, etc. In some implementations, a size of the blocks of events is based on the object to be tracked (e.g., finger, hand, body, etc.).

In some implementations, an entity is determined using the blocks of events at each of the plurality of times. In some implementations, the entity (e.g., particle, a hand) at each of the multiple times includes a subset of the blocks of events associated with a respective time. As shown in FIG. 6, at least one entity 600 (e.g., representing 1 hand 412 of the person 410) in the physical environment is identified at each of the plurality of times $T_1, T_2, \ldots, T_N$. In some implementations, the subset of the blocks of events identifying the entity 600 at each of the plurality of times is based on a grouping radius, a distance factor between the plurality of the blocks of events, a smoothing factor, a time factor, or the like.

In some implementations, a path 610 is determined by tracking a position of the entity 600 at the multiple times. In some implementations, the event camera 422b detects an initial grouped subset of the blocks of events and additional grouped subsets of the blocks of events that move through the physical environment 405 until termination to determine the path 610. As shown in FIG. 6, tracking the position (e.g., a center) of the entity 600 as the entity moves over time provides the path 610. In some implementations, the entity 600 is created (e.g., by movement), tracked and then dropped (e.g., after a period of inactivity) to form the path 610. In some implementations, the event camera 422b determines a cluster of intensity changes causing events that starts at a first time, tracks clusters of intensity changes that propagate through the physical environment 405 at a plurality of intermediate times until no additional clusters of intensity changes occur at a second time.

In some implementations, the path 610 of the entity is plotted and shown as a path 610' in the display 426 of the electronic device 420. In some implementations, a gesture of a person 410 (e.g., predetermined movement of a body part of the person 410) is identified based on the path 610. Thus, a gesture of a person 410 (e.g., the hand 412) is identified based on the event camera data. In some implementations, the gesture of the person 410 is a identified using a path of 2 or more entities tracked in the event camera data. In some implementations, moving fingers, moving body parts, moving limbs (e.g., just an arm) are tracked to determine a gesture of the person 410. In some implementations, moving body parts of two or more people are tracked to determine a gesture of the people. In some implementations, the path 610' is part of a CGR environment. In some implementations, the path 610' determines a gesture that is an operator command to an electronic device or a CGR environment.

Figure 7A:
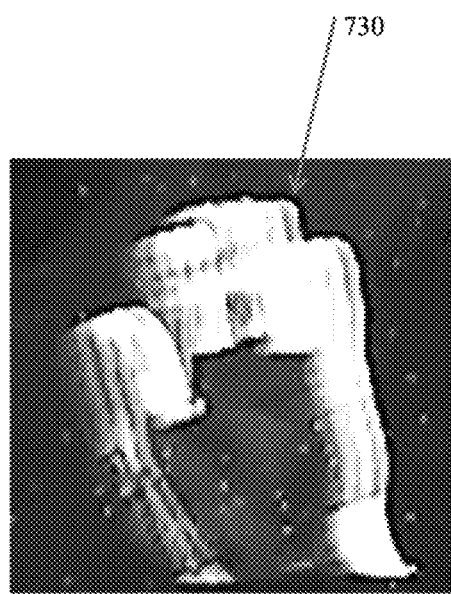
FIGS. 7A-7B are diagrams illustrating an example of events detected by an event camera and a grouping of blocks of the detected events at a given time in accordance with some implementations.

As shown in FIG. 7A, a plurality of events 730 within the bounding box are detected by the event camera 422b. In some implementations, the events 730 detected by the event camera 422b include positive events (e.g., generated by the leading edge of the hand or fingers) and negative events (e.g., generated by the trailing edge of the hand of fingers). For example, the plurality of events 730 are detected by the event camera 422b within the bounding box 510.

Figure 7B:
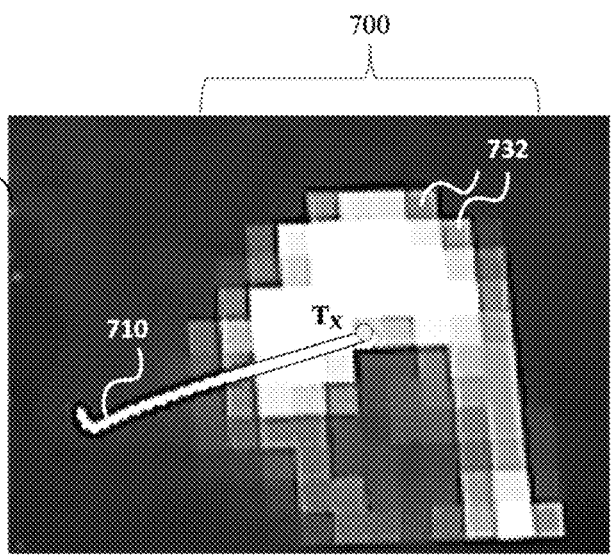

As shown in FIG. 7B, a subset of the blocks 732 of events 730 are grouped to identify an entity 700 in some implementations. The entity 700 can be tracked at multiple times to determine a path. A portion of a path 710 of the entity 700 is shown at a given time $T_x$ in FIG. 7B. In some implementations, the path is used to determine a gesture, for example, using machine learning (ML). In some implementations, a first neural network is trained to identify gestures when a path is input.

In some implementations, the entity is a hand and a first configuration of the hand determines a first hand pose at a beginning of the path and a second configuration of the hand determines second hand pose at an end of the path, and the gesture includes the first hand pose, the path, and the second hand pose. In some implementations, the second hand pose is different from the first hand pose. In some implementations, ML or a second neural network can be trained to identify or output the hand pose when a given configuration of the hand is entered or input.

In some implementations, the electronic device 420 is the electronic device where processing of the event camera data occurs. In some implementations, the electronic device 420 is the same electronic device (e.g., laptop) that includes the event camera 422b. In some implementations, the electronic device 420 is a different electronic device that receives the event data from an electronic device that has the event camera 422b (e.g. a server receiving the event data from the laptop). In some implementations, a single electronic device including a processor has the event camera 422b, the optical source 422a, and the frame-based camera 422c. In some implementations, the event camera 422b, the optical source 422a, and the frame-based camera 422c are located on more than one electronic device.

Figure 8:
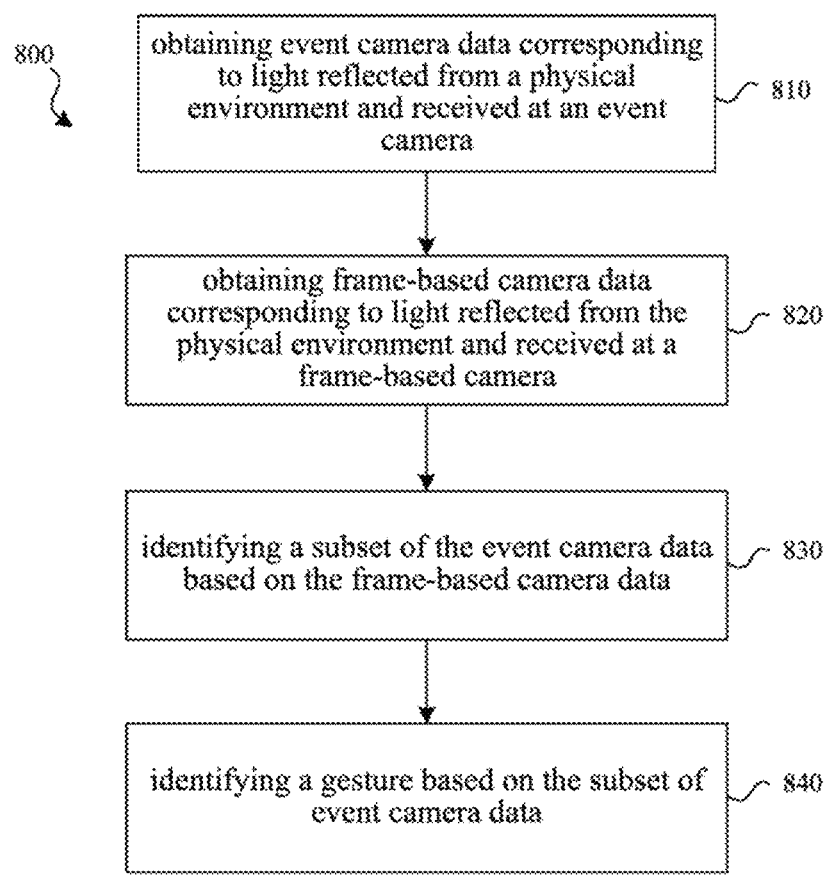
FIG. 8 is a flow-chart illustrating an example of a method of gesture recognition in accordance with some implementations.

FIG. 8 is a flowchart illustrating an exemplary method of gesture recognition according to some implementations. In some implementations, the method 800 is performed by an electronic device (e.g., controller 110 or electronic device 120 of FIGS. 1-3). The method 800 can be performed at a mobile device, HMD, desktop, laptop, server device, or by multiple devices in communication with one another. In some implementations, the method 800 is performed by processing logic, including hardware, firmware, software, or a combination thereof. In some implementations, the method 800 is performed by a processor executing code stored in a non-transitory computer-readable medium (e.g., a memory).

At block 810, the method 800 obtains event camera data corresponding to light reflected from a physical environment and received at an event camera. In some implementations, the method 800 obtains the event camera data corresponding to the light reflected from the physical environment and received at an event camera in a first wavelength band (e.g., IR light). In some implementations, the event camera detects IR light to reduce noise in the event camera data. In some implementations, the event camera data is produced based on changes in light intensity detected at pixel sensors of the event camera. In some implementations, events detected by the event camera are triggered by changes in light intensity exceeding a comparator threshold.

At block 820, the method 800 obtains frame-based camera data corresponding to light reflected from the physical environment and received at a frame-based camera. In some implementations, the method 800 obtains the frame-based camera data corresponding to the light reflected from the physical environment and received at a frame-based camera in a second wavelength band (e.g., visible light). In some implementations, the second wavelength band is different from the first wavelength band. In some implementations, a FOV of the event camera and a FOV of the frame-based camera are temporally or spatially correlated.

At block 830, the method 800 identifies a subset of the event camera data based on the frame-based camera data. In some implementations at block 830, the frame-based camera identifies a region of interest in the physical environment within which the event camera can analyze event data. For example at block 830, the frame-based camera removes the background in the physical environment from consideration in the event camera analysis. For example at block 830, the frame-based camera selects a foreground portion of the physical environment (e.g., hands of a person) for consideration in the event camera analysis. In some implementations, the subset of the event camera data is identified by color analysis of the frame-based camera data.

At block 840, the method 800 identifies a gesture of a person (e.g., predetermined movement of a body part or object held by the body part of the person) based on the subset of the event camera data. In some implementations, at block 840 the method 800 identifies the gesture by tracking clusters of events in the subset of the event camera data over time to determine a path. In some implementations at block 840, the path is determined by tracking a grouping (e.g., a hand) of blocks of event camera events at multiple different point in time where each block has a preset number of events at each of the multiple times.

In some implementations, machine learning (ML) or a ML model may be used analyze entity paths to recognize or detect gestures at block 840. In some implementations, a first neural network is trained to recognize gestures in movements given a path of an entity as input. In some implementations, movements include poses of the entity (e.g., hand positions such as a fist, finger or fingers extended, flat hand or hand orientations such as flat hands being vertical or horizontal). In some implementations, the gestures include poses of the entity at either a beginning or an end of the entity path. In some implementations, the gestures include one or more poses of the entity along the entity path. In various implementations, the ML model can be, but is not limited to being, a deep neural network (DNN), an encoder/decoder neural network, a convolutional neural network (CNN), or a generative adversarial neural network (GANN). In some implementations, the event camera data used to detect gestures is designated for automated processing (e.g., machine viewing and not human viewing) to address privacy concerns. In some implementations, images from the frame-based camera can be combined with the event camera data for ML. In some implementations, the frame-based camera data includes image data that is first analyzed to detect entities such as body parts, which are then analyzed for movement (e.g., gesture recognition). In some implementations, first the hands are detected and then the gesture is detected in the hand movements.

In some implementations, the event camera data or the subset of event camera data corresponding to reflected IR light from the physical environment is the result of an IR light source in the physical environment. In some implementations, the IR light can be focused over a preset operational range (e.g., distance, height, or width).

Figure 9:
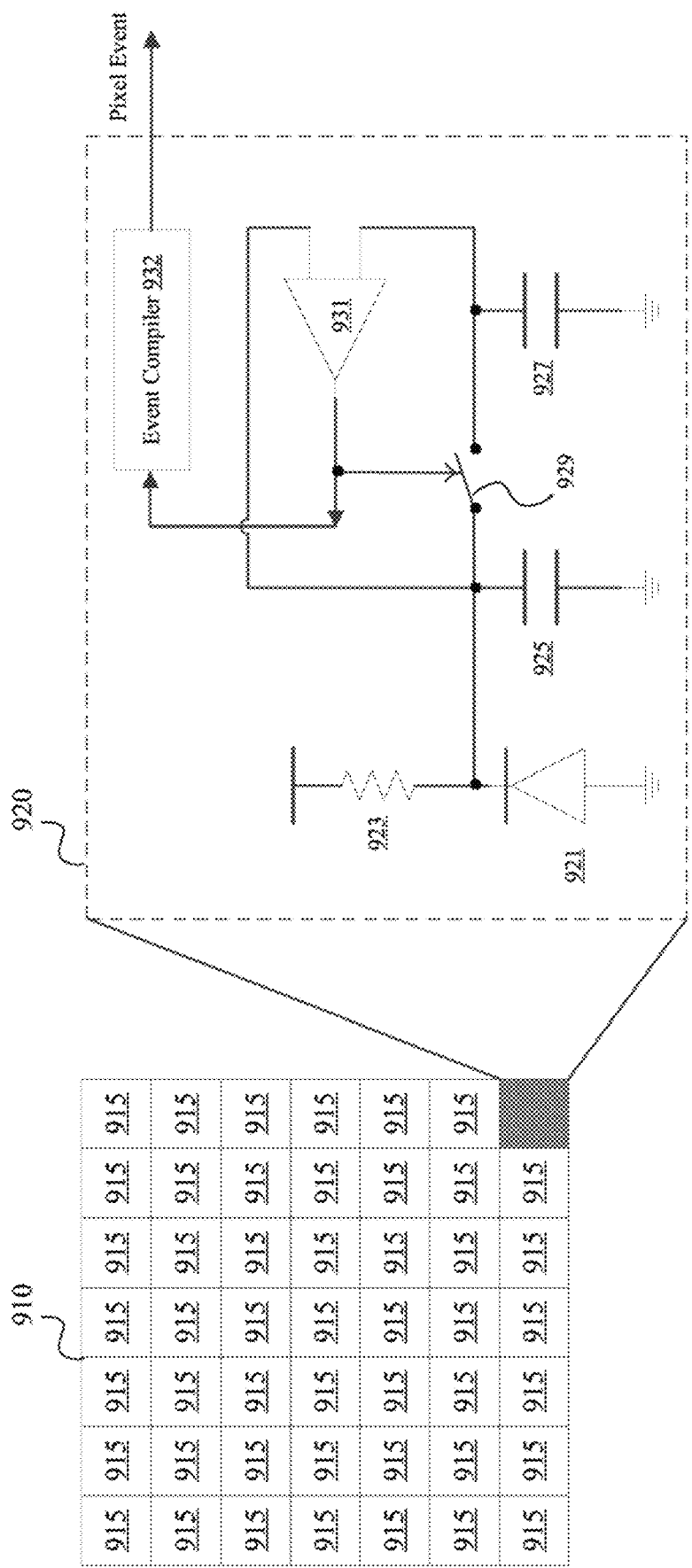
FIG. 9 is a block diagram of pixel sensors for an example event camera and an example circuit diagram of a pixel sensor, in accordance with some implementations.

FIG. 9 is a block diagram of pixel sensors for an example event camera and an example circuit diagram of a pixel sensor, in accordance with some implementations. As illustrated by FIG. 9, pixel sensors 915 may disposed on an event camera at known locations relative to an electronic device (e.g., the electronic device 120 of FIG. 1) by arranging the pixel sensors 915 in a 2D matrix 910 of rows and columns. In the example of FIG. 9, each of the pixel sensors 915 is associated with an address identifier defined by one row value and one column value.

FIG. 9 also shows an example circuit diagram of a circuit 920 that is suitable for implementing a pixel sensor 915. In the example of FIG. 9, circuit 920 includes photodiode 921, resistor 923, capacitor 925, capacitor 927, switch 929, comparator 931, and event compiler 932. In operation, a voltage develops across photodiode 921 that is proportional to an intensity of light incident on the pixel sensor. Capacitor 925 is in parallel with photodiode 921, and consequently a voltage across capacitor 925 is the same as the voltage across photodiode 921.

In circuit 920, switch 929 intervenes between capacitor 925 and capacitor 927. Therefore, when switch 929 is in a closed position, a voltage across capacitor 927 is the same as the voltage across capacitor 925 and photodiode 921. When switch 929 is in an open position, a voltage across capacitor 927 is fixed at a previous voltage across capacitor 927 when switch 929 was last in a closed position. Comparator 931 receives and compares the voltages across capacitor 925 and capacitor 927 on an input side. If a difference between the voltage across capacitor 925 and the voltage across capacitor 927 exceeds a threshold amount ("a comparator threshold"), an electrical response (e.g., a voltage) indicative of the intensity of light incident on the pixel sensor is present on an output side of comparator 931. Otherwise, no electrical response is present on the output side of comparator 931.

When an electrical response is present on an output side of comparator 931, switch 929 transitions to a closed position and event compiler 932 receives the electrical response. Upon receiving an electrical response, event compiler 932 generates a pixel event and populates the pixel event with information indicative of the electrical response (e.g., a value or polarity of the electrical response). In one implementation, event compiler 932 also populates the pixel event with one or more of: timestamp information corresponding to a point in time at which the pixel event was generated and an address identifier corresponding to the particular pixel sensor that generated the pixel event.

An event camera generally includes a plurality of pixel sensors like pixel sensor 915 that each output a pixel event in response to detecting changes in light intensity that exceed a comparative threshold. When aggregated, the pixel events output by the plurality of pixel sensor form a stream of pixel events that are output by the event camera.

Figure 10:
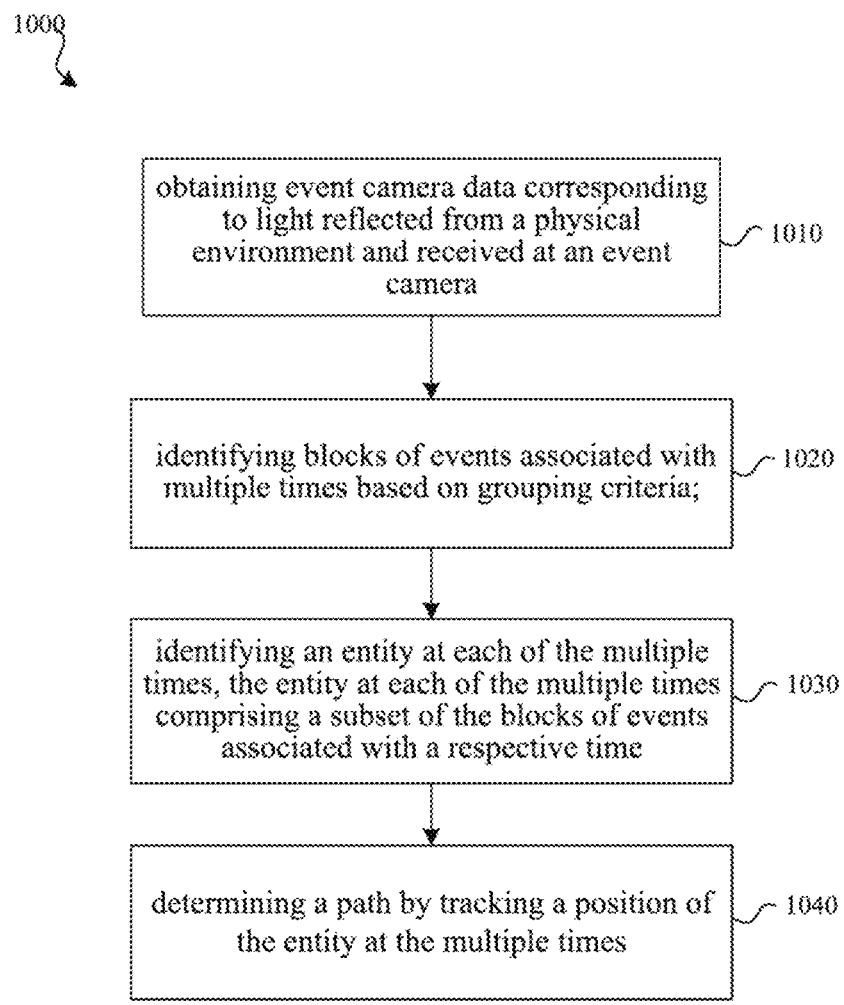
FIG. 10 is a flow-chart illustrating an example of a method of identifying a path of an entity in accordance with some implementations.

FIG. 10 is a flowchart illustrating an exemplary method of identifying a path of an entity according to some implementations. In some implementations, the method 1000 is performed by an electronic device (e.g., controller 110 or electronic device 120 of FIGS. 1-3). The method 1000 can be performed at a mobile device, HMD, desktop, laptop, server device, or by multiple devices in communication with one another. In some implementations, the method 1000 is performed by processing logic, including hardware, firmware, software, or a combination thereof. In some implementations, the method 1000 is performed by a processor executing code stored in a non-transitory computer-readable medium (e.g., a memory).

At block 1010, the method 1000 obtains event camera data corresponding to light reflected from a physical environment and received at an event camera. In some implementations, the method 1000 obtains the event camera data corresponding to the light reflected from the physical environment and received at an event camera in a first wavelength band. In some implementations, the event camera is tuned specifically to IR light to reduce noise (e.g., ambient light) in the event camera data.

At block 1020, the method 1000 identifies blocks of events associated with multiple times based on blocking criteria. In some implementations, each block of the blocks of events is a region having a predetermined number of events that occur at a given time (e.g., small time interval). In some implementations, the number of events determines a size or resolution of the blocks of events. In some implementations, fewer events per block at each of the multiple times provides smaller blocks or a finer resolution depiction of the physical environment. Similarly, more events per block at each of the multiple times provides larger blocks or a lower resolution depiction of the physical environment. In some implementations, the number of blocks of events at each of the multiple time is different. For example, there may be 100 blocks of events associated with a time T1, and 90 blocks of events associated with a second time T2, etc.

At block 1030, the method 1000 identifies an entity (e.g., particle) at each of the multiple times. In some implementations, the entity at each of the multiple times includes a subset of the blocks of events associated with a respective time. In the example described at block 1020, the entity may be 90 of the 100 blocks of events associated with the time T1, etc. In some implementations, the subset of the blocks of events at each of the multiple times is based on a grouping radius, a distance factor between the plurality of the blocks of events, a smoothing factor, or a time factor. In some implementations, clumps of individual blocks of events are determined to represent 1 hand of a person in the physical environment.

At block 1040, the method 1000 determines a path by tracking a position of the entity at the multiple times. In some implementations, a selected portion or location of the entity is tracked as the entity moves over time to determine the path. In some implementations, the path identifies a gesture (e.g., predetermined movement of a body part) of a user based on the event camera data. In some implementations, the gesture is a hand gesture. In some implementations, ML or a ML model may be used analyze entity paths to recognize or detect gestures at block 1040 (see block 840).

In some implementations at block 1010, the event camera data is a subset of the event camera data identified by selectively including only event camera data corresponding to a portion of the physical environment (e.g., user body part or hand). In some implementations at block 1010, the method 1000 obtains frame-based camera data corresponding to light received at a frame-based camera, and identifies the subset of the event camera data based on the frame-based camera data. In some implementations, the frame-based camera data spatially or temporally corresponds to the event camera data. In some implementations, the subset of the event camera data is identified by color analysis of the frame-based camera data. In some implementations, the frame-based camera data is used to remove the background of the physical environment from consideration in the event camera analysis.

In some implementations, the event camera data corresponding to the IR light reflected from the physical environment is received at the event camera included at a first electronic device including a processor. In some implementations, a second electronic device separate from the first electronic device includes the event camera. In some implementations, the IR light reflected from the physical environment is received at block 1010 at the second electronic device and transmitted to the first electronic device. In some implementations, the first electronic device is where processing occurs to implement the method 1000.

Numerous specific details are set forth herein to provide a thorough understanding of the claimed subject matter. However, those skilled in the art will understand that the claimed subject matter may be practiced without these specific details. In other instances, methods apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method of gesture recognition, the method comprising:
   at an electronic device having a processor;
      obtaining event camera data corresponding to light reflected from a physical environment and received at an event camera, the event camera data produced based on changes in light intensity detected at pixel sensors of the event camera;
      obtaining frame-based camera data corresponding to light reflected from the physical environment and received at a frame-based camera;
      identifying a subset of the event camera data based on identifying that the event camera data of the subset corresponds to a portion of a person based on the frame-based camera data; and
      identifying a gesture based on the subset of event camera data.

2. The method of claim 1, wherein the event camera uses a first light wavelength band and the frame-based camera uses a different second light wavelength range.

3. The method of claim 1, further comprising illuminating the physical environment with an infrared (IR) light source, wherein the event camera uses reflected IR light and the frame-based camera uses reflected visible light.

4. The method of claim 3, wherein the IR light source is variable in size, intensity, or steerable.

5. The method of claim 1, wherein the event camera uses reflected IR light within an intensity range.

6. The method of claim 1, wherein identifying the subset of the event camera data comprises excluding event camera data corresponding to a background portion of the physical environment.

7. The method of claim 1, wherein identifying the subset of the event camera data comprises color analysis of the frame-based camera data.

8. The method of claim 1, wherein identifying the subset of the event camera data comprises temporally and spatially correlating a field of view of the event camera with a field of view of the frame-based camera.

9. The method of claim 1, wherein the electronic device comprises the event camera or wherein a second electronic device comprises the event camera, the second electronic device separate from the electronic device.

10. The method of claim 1, wherein the event camera data corresponds to pixel events triggered based on changes in light intensity at pixel sensors exceeding a comparator threshold or wherein the event camera data excludes data corresponding to visible light (VL) intensity changes.

11. The method of claim 1, wherein the gesture comprises a hand movement.

12. The method of claim 1, wherein identifying the gesture comprises evaluating the event camera data using a machine learning algorithm.

13. The method of claim 1, wherein identifying the gesture comprises identifying a path of one or more hands of a person in the physical environment.

14. A system comprising:
    a non-transitory computer-readable storage medium; and
    one or more processors coupled to the non-transitory computer-readable storage medium, wherein the non-transitory computer-readable storage medium comprises program instructions that, when executed on the one or more processors, cause the system to perform operations comprising:
       obtaining event camera data corresponding to light reflected from a physical environment and received at an event camera, the event camera data produced based on changes in light intensity detected at pixel sensors of the event camera;
       obtaining frame-based camera data corresponding to light reflected from the physical environment and received at a frame-based camera;
       identifying a subset of the event camera data based on identifying that the event camera data of the subset corresponds to a portion of a person based on the frame-based camera data; and
       identifying a gesture based on the subset of event camera data.

* * * * *

UNITED STATES PATENT AND TRADEMARK OFFICE
CERTIFICATE OF CORRECTION

PATENT NO. : 12,289,559 B2
APPLICATION NO. : 17/590036
DATED : April 29, 2025
INVENTOR(S) : Sai Harsha Jandhyala and Raffi A. Bedikian It is certified that error appears in the above-identified patent and that said Letters Patent is hereby corrected as shown below:

On the Title Page

ABSTRACT, Item (57), Line 15, reads:
"...implementations, a path (e.g., of a hand) by tracking a..."

Should read:
--...implementations, a path (e.g., of a hand) is identified by tracking a...--

Signed and Sealed this
Twenty-seventh Day of May, 2025

Coke Morgan Stewart
*Acting Director of the United States Patent and Trademark Office*